(12) United States Patent
Shibui et al.

(10) Patent No.: US 7,352,077 B2
(45) Date of Patent: Apr. 1, 2008

(54) MOTOR-DRIVEN SUPERCHARGER

(75) Inventors: Yasuyuki Shibui, Tokyo (JP); Yukio Takahashi, Tokyo (JP); Narifumi Tojima, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 11/463,090

(22) Filed: Aug. 8, 2006

(65) Prior Publication Data
US 2007/0108772 A1 May 17, 2007

(30) Foreign Application Priority Data
Aug. 8, 2005 (JP) ............... 2005-229005

(51) Int. Cl.
*F02B 39/00* (2006.01)
(52) U.S. Cl. ....................................... 290/52
(58) Field of Classification Search ................... 290/52
See application file for complete search history.

(56) References Cited

U.S. PATENT DOCUMENTS

| 4,253,031 A |   | 2/1981 | Frister |
|---|---|---|---|
| 4,745,755 A | * | 5/1988 | Kawamura .................... 60/608 |
| 4,757,686 A | * | 7/1988 | Kawamura et al. ........... 60/608 |
| 4,833,887 A | * | 5/1989 | Kawamura et al. ........... 60/608 |
| 5,121,605 A |   | 6/1992 | Oda et al. |
| 5,323,613 A | * | 6/1994 | Akiyama ..................... 60/608 |
| 5,798,587 A |   | 8/1998 | Lee |
| 5,857,332 A |   | 1/1999 | Johnston et al. |
| 5,904,471 A |   | 5/1999 | Woollenweber et al. |
| 6,032,466 A |   | 3/2000 | Woolenweber et al. |
| 6,102,672 A |   | 8/2000 | Woolenweber et al. |
| 6,160,332 A |   | 12/2000 | Tsuruhara |
| 6,218,747 B1 |   | 4/2001 | Tsuruhara |
| 6,257,834 B1 |   | 7/2001 | Bremer et al. |
| 6,278,199 B1 | * | 8/2001 | Grant et al. ............... 370/10.1 |
| 6,416,281 B1 |   | 7/2002 | Bremer et al. |
| 6,449,950 B1 |   | 9/2002 | Allen et al. |
| 6,609,375 B2 |   | 8/2003 | Allen |
| 6,647,724 B1 |   | 11/2003 | Arnold et al. |

(Continued)

FOREIGN PATENT DOCUMENTS

DE        41 15 273 C1        6/1992

(Continued)

OTHER PUBLICATIONS

Search Report issued in related European application No. 60 01 7066 completed Oct. 16, 2006.

(Continued)

*Primary Examiner*—Joseph Waks
(74) *Attorney, Agent, or Firm*—Griffin & Szipi, P.C.

(57) ABSTRACT

There are provided with a motor rotor (22) fixed to a turbine shaft (12) and rotating together with the turbine shaft, a motor stator (24) surrounding the motor rotor and fixed within a bearing housing (16), an inverted (26) converting a dc power into an ac power, and an inverter controller (28) controlling a frequency and a voltage of the ac power by the inverter. The inverter and the inverter controller are accommodated in a driver container (29), and are coupled to a compressor housing (20) by an insulating coupling member (30).

2 Claims, 3 Drawing Sheets

U.S. PATENT DOCUMENTS

| | | |
|---|---|---|
| 6,668,553 B1 | 12/2003 | Ghizawi |
| 7,010,916 B2 | 3/2006 | Sumser et al. |
| 2003/0118461 A1 | 6/2003 | Hodapp et al. |
| 2006/0123783 A1 | 6/2006 | Philippe |
| 2006/0245913 A1 | 11/2006 | Thiele et al. |
| 2007/0036664 A1 | 2/2007 | Shibui et al. |

FOREIGN PATENT DOCUMENTS

| | | |
|---|---|---|
| DE | 100 22 113 A1 | 11/2001 |
| DE | 101 56 704 A1 | 5/2003 |
| DE | 10 2005 052 363 A1 | 5/2007 |
| EP | 0 212 988 | 3/1987 |
| EP | 1 348 848 A2 | 10/2003 |
| FR | 2 859 499 A1 | 3/2005 |
| GB | 2 021 874 A | 12/1979 |
| JP | 01019122 | 1/1989 |
| JP | 02-99722 | 4/1990 |
| JP | 03138430 A * | 6/1991 |
| JP | 05199708 A | 8/1993 |
| JP | 06346748 A * | 12/1994 |
| JP | 07102988 A * | 4/1995 |
| JP | 2000-130176 | 5/2000 |
| JP | 2000-514897 | 11/2000 |
| JP | 3389748 B2 * | 3/2003 |
| JP | 2003-293785 | 10/2003 |
| JP | 2004-044451 | 2/2004 |
| JP | 2004-44452 | 2/2004 |
| JP | 2005-069178 | 3/2005 |
| WO | WO 98/02652 | 1/1998 |
| WO | 98/30790 A2 | 7/1998 |
| WO | 98/30790 A3 | 7/1998 |
| WO | 2005/024202 A1 | 3/2005 |
| WO | 2005028876 A1 | 3/2005 |

OTHER PUBLICATIONS

Office Action issued in related U.S. Appl. No. 11/463,665, mailed Aug. 3, 2007.

Office Action issued in related U.S. Appl. No. 11/462,807, mailed Aug. 3, 2007.

Notice of Allowance issued in related U.S. Appl. No. 11/463,665, mailed dec. 19, 2007.

Office Action issued in related U.S. Appl. No. 11/463,807, mailed Dec. 19, 2007.

Extended European Search Report issued in related application No. 06 01 6269, completed Oct. 10, 2007.

Extended European Search Report issued in corresponding application No. 06 01 6455, completed Oct. 12, 2007.

* cited by examiner

MOTOR-DRIVEN SUPERCHARGER

This application claims priority from Japanese Patent Application No. 229005/2005, filed Aug. 8, 2005, the entire disclosure of which is incorporated herein by reference.

BACKGROUND OF THE INVENTION

1. Field of the Invention

The present invention relates to an exhaust turbine supercharger, and more particularly to a motor-driven supercharger having an electric motor built-in.

2. Description of Related Art

To supply an air having a density increased by a compressor to an engine is called supercharging, and a structure providing for a driving work of the compressor on the basis of an exhaust energy is called as an exhaust-gas turbocharger.

The exhaust-gas turbocharger is generally constituted by a compressor and a turbine which are arranged so as to position a bearing unit therebetween. The compressor has a compressor impeller built-in, and the turbine has a turbine impeller built-in, respectively. The compressor impeller and the turbine impeller are coupled to each other by a connecting shaft supported by a bearing unit, and are structured such as to rotationally drive the turbine impeller by an exhaust gas of the engine, transmit the rotating force to the compressor impeller via the connecting shaft, and compress the air by the compressor impeller so as to supercharge to the engine.

In the exhaust turbine supercharger mentioned above, there has been already proposed a structure having an electric motor built-in for assisting an acceleration at a time of rotating at a low speed (for example, patent documents 1 and 2). Hereinafter, the exhaust-gas turbocharger having the electric motor built-in mentioned above is simply called as "motor-driven supercharger".

A turbocharger in the patent document 1 is provided with a power generator constituted by a power generating and motor driving rotor 54 attached onto a shaft 53 coupling a turbine 51 and a compressor 52, and a stator 56 attached within a housing 55, and a cooling water jacket 57 formed in an inner portion of a housing surrounding the stator for cooling the stator, as shown in FIG. 1.

The patent document 2 relates to a motor-driven compressor. As shown in FIG. 2, the motor-driven compressor is provided with a compressor housing 61, an electric motor 62 and a centrifugal compressor wheel 63. The compressor housing 61 forms a compressed air outlet positioned in an outer periphery, and an outer peripheral casing 61*a* and an inner motor support 61*b* of the compressor housing form a flow path introducing an ambient air from a portion therebetween.

Patent Document 1:
Japanese Unexamined Patent Publication No. 2000-130176 "TURBOCHARGER PROVIDED WITH GENERATOR AND MOTOR"

Patent Document 2:
U.S. Pat. No. 5,904,471 "COOLING MEANS FOR A MOTOR-DRIVEN CENTRIFUGAL AIR COMPRESSOR"

A rotating speed of the exhaust-gas turbocharger is high, and comes up to, for example, at least 100 to 200 thousand rpm. Accordingly, the electric motor installed in the motor-driven supercharger mentioned above is demanded such that a rotational drive and a regenerative operation can be executed at a high speed in correspondence to the high-speed rotation.

In order to satisfy the demand, in the case that a brushless ac motor is employed as the electric motor, it is absolutely necessary to employ an inverter converting a dc power of a battery mounted to a vehicle into an ac power having an optional frequency.

However, since the electric power after converted by the inverter is the ac power, there is a problem that a great power loss is generated due to an electric resistance and an inductance of a power supply cable connecting the inverter and the motor-driven supercharger. Accordingly, particularly in the case that the frequency is high, it is necessary to supply a greater electric power than an electric power inherently consumed by the electric motor from the inverter, so that there is a problem that the inverter itself is enlarged in size in addition to the great loss.

SUMMARY OF THE INVENTION

The present invention is made for solving the problem mentioned above. In other words, an object of the present invention is to provide a motor-driven supercharger which can widely reduce a power loss caused by a power supply cable connecting an inverter and a motor-driven supercharger.

In accordance with the present invention, there is provided a motor-driven supercharger comprising:
a turbine shaft having a turbine impeller in one end;
a compressor impeller coupled to the other end of the turbine shaft;
a bearing housing rotatably supporting the turbine shaft;
a turbine housing surrounding the turbine impeller and coupled to the bearing housing; and
a compressor housing surrounding the compressor impeller and coupled to the bearing housing,
wherein the motor-driven supercharger further comprises:
a motor rotor fixed to the turbine shaft and rotating together with the turbine shaft;
a motor stator surrounding the motor rotor and fixed within the bearing housing;
an inverter converting a dc power into an ac power so as to input to the motor stator; and
an inverter controller controlling a frequency and a voltage of the ac power by the inverter on the basis of an external command.

In accordance with a preferable mode of the present invention, there is provided a motor-driven supercharger, further comprising:
a driver container accommodating the inverter and the inverter controller; and
an insulating coupling member coupling the driver container to the compressor housing,
wherein the driver container is formed in a donut shape or a U shape, and
wherein the insulating coupling member has an air-cooled or water-cooled insulating layer insulating heat in such a manner as to prevent a high temperature of the air discharged from the compressor from being transferred to the driver container.

It is preferable that the inverter is constituted by an inverter of a pulse width modulation (PWM) type controlling both a frequency and a voltage.

In accordance with the present invention mentioned above, since the motor-driven supercharger is provided with the motor stator, the inverter and the inverter controller, it is possible to widely shorten a length of the power supply cable connecting the inverter and the motor-driven supercharger. Accordingly, since a distance between the electric motor and the inverter becomes shortest, it is possible to reduce an electric resistance and an inductance of the power supply cable to a negligible level.

Further, since the inverter is integrally formed with the motor-driven supercharger, an installation place for the inverter is not necessary.

The other objects and advantages of the present invention will become apparent from the following description with reference to the accompanying drawings.

DESCRIPTION OF PREFERRED EMBODIMENT

Figure 1:
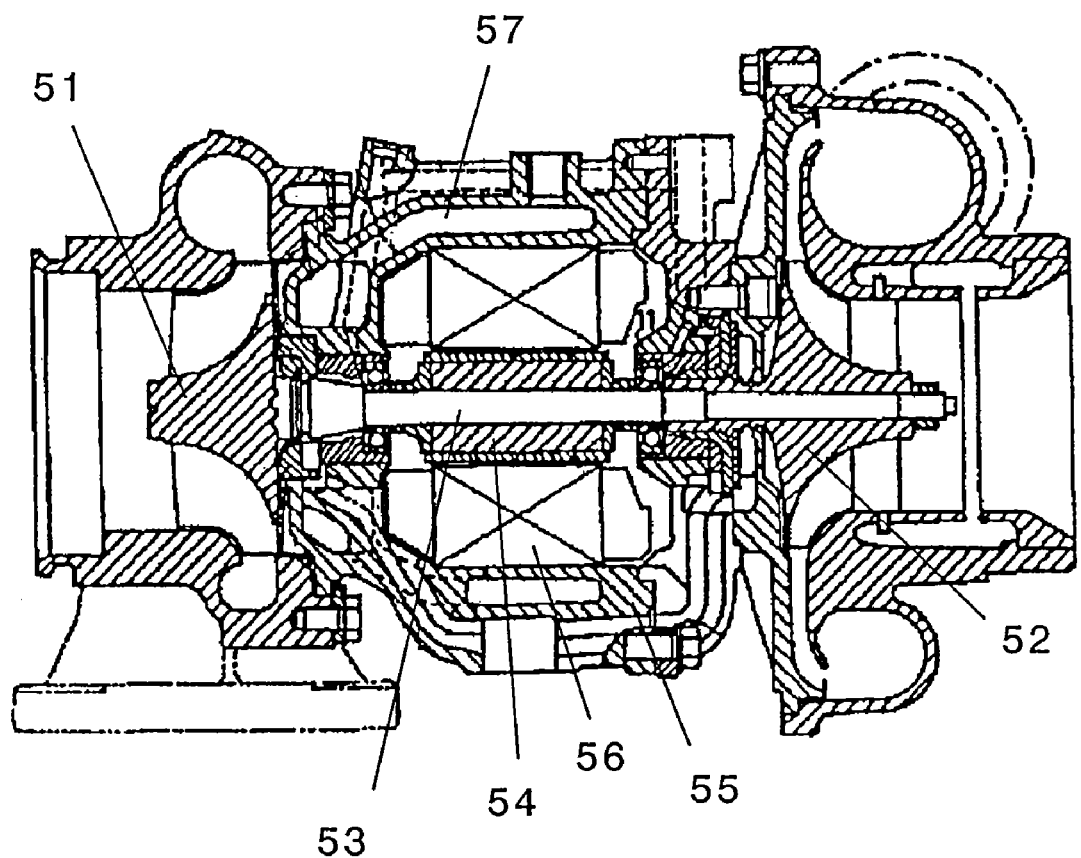
FIG. 1 is a schematic view of a turbocharger in patent document 1.
Figure 2:
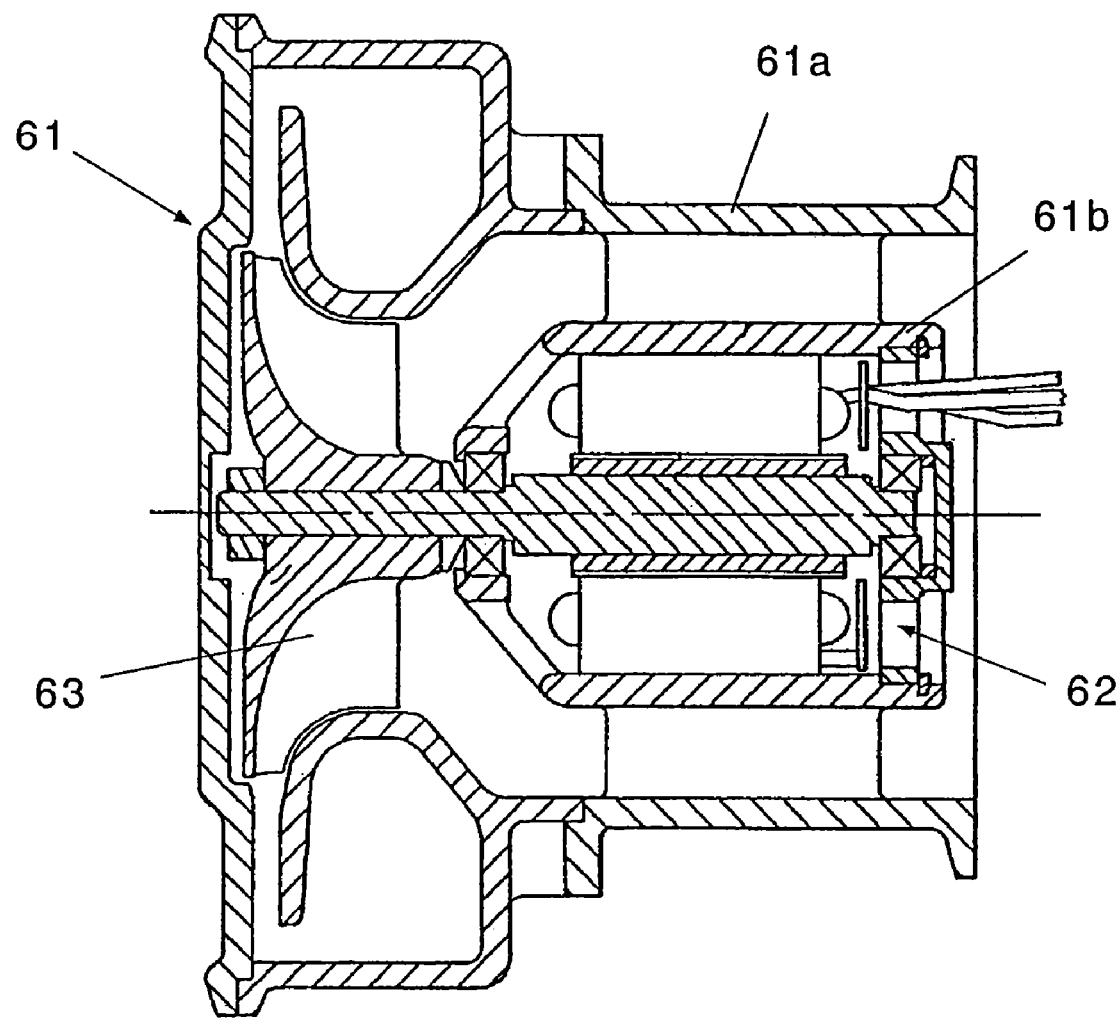
FIG. 2 is a schematic view of a motor-driven compressor in patent document 2.

A description will be given below of a preferable embodiment in accordance with the present invention with reference to the accompanying drawings. In this case, the same reference numerals are attached to the common portions in each of the drawings, and an overlapping description will be omitted.

Figure 3:
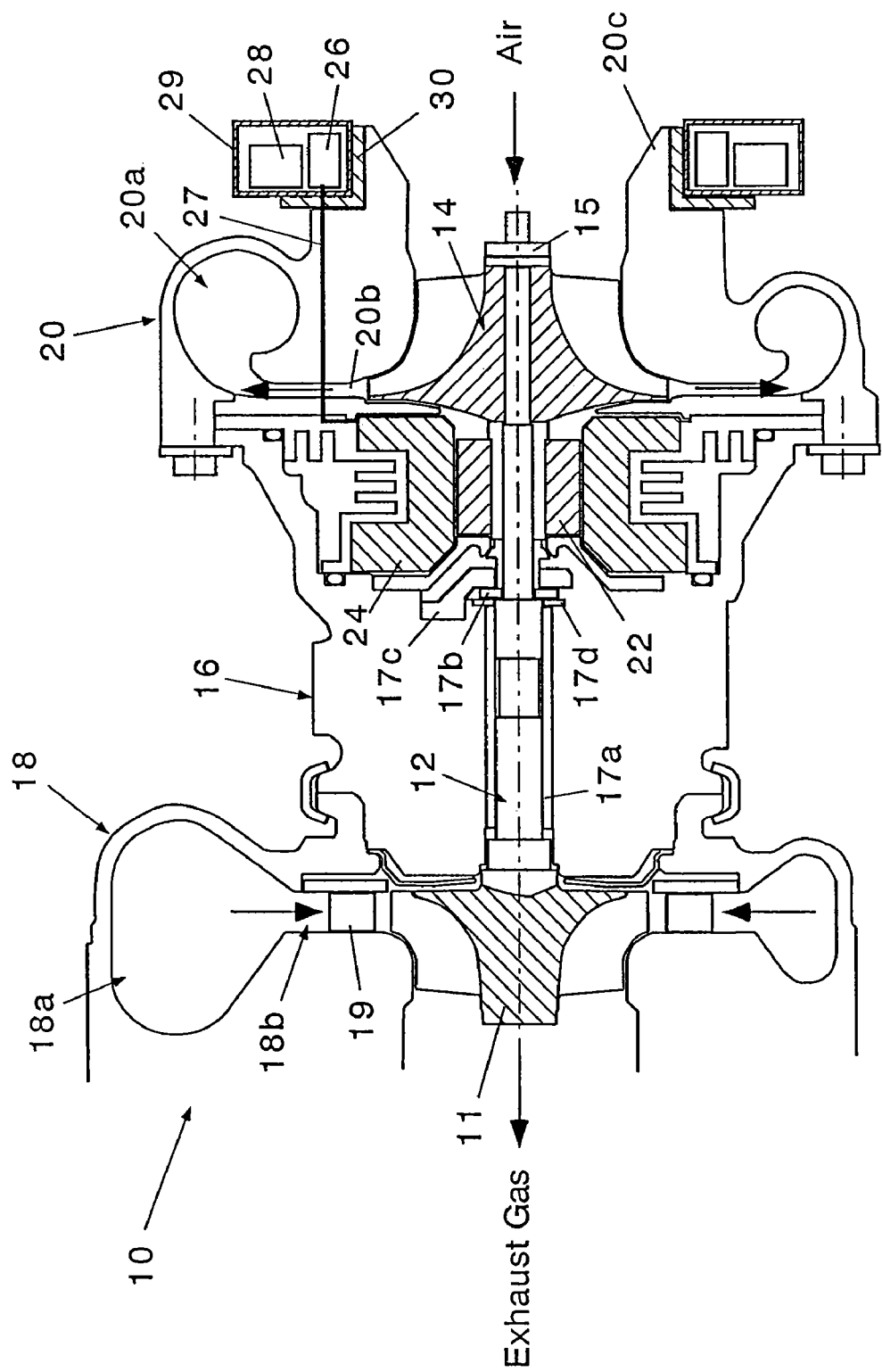
FIG. 3 is a view of an entire structure of a motor-driven supercharger in accordance with the present invention.

FIG. 3 is a view of an entire structure of a motor-driven supercharger in accordance with the present invention. In this drawing, a motor-driven supercharger 10 in accordance with the present invention is provided with a turbine shaft 12, a compressor impeller 14, a bearing housing 16, a turbine housing 18 and a compressor housing 20.

The turbine shaft 12 has a turbine impeller 11 in one end (a left end in the drawing). In this embodiment, the turbine impeller 11 is integrally formed in the turbine shaft 12. However, the present invention is not limited to this, but may be structured such that the turbine impeller 11 is independently attached.

The compressor impeller 14 is coupled to the other end (a right end in the drawing) of the turbine shaft 12 by a shaft end nut 15 so as to integrally rotate.

The bearing housing 16 rotatably supports the turbine shaft 12 by a bearing metal 17a. Further, the turbine shaft 12 is supported by a thrust collar 17b and thrust bearings 17c and 17d so as to be immobile in an axial direction. Further, the bearing housing 16 has a lubricating fluid flow path (not shown) for lubricating the bearing metal 17a, the thrust collar 17b and the thrust bearings 17c and 17d.

The turbine housing 18 rotatably surrounds the turbine impeller 11, and is coupled to the bearing housing 16. The turbine housing 18 has a scroll chamber 18a in which an exhaust gas is introduced to an inner portion from an external portion, and an annularly formed flow path 18b guiding the exhaust gas to the turbine impeller 11 from the scroll chamber 18a.

Further, in the flow path 18b, a plurality of nozzle vanes 19 are arranged at a fixed interval in a peripheral direction. The nozzle vane 19 is constituted by a variable nozzle vane, and it is preferable that the nozzle vane 19 can change a flow path area formed therebetween. However, the present invention is not limited to this, but may be constituted by a fixed nozzle vane.

The compressor housing 20 rotatably surrounds the compressor impeller 14, and is coupled to the bearing housing 16. The compressor housing 20 has a scroll chamber 20a in which the compressed air is introduced to an inner portion, and an annularly formed flow path 20b guiding the compressed air to the scroll chamber 20a from the compressor impeller 14.

On the basis of the structure mentioned above, it is possible to rotationally drive the turbine impeller 11 by the exhaust gas of the engine, it is possible to transmit the rotating force to the compressor impeller 14 via the turbine shaft 12, and it is possible to compress the air by the compressor impeller 14 so as to supercharge to the engine.

In FIG. 3, the motor-driven supercharger 10 in accordance with the present invention is further provided with a motor rotor 22, a motor stator 24, an inverter 26 and an inverter controller 28.

The motor rotor 22 is fixed to the turbine shaft 12 so as to rotate together with the turbine shaft. The motor rotor 22 corresponds to a rotor of the electric motor. Further, the motor stator 24 surrounds the motor rotor 22, is fixed within the bearing housing 16. the motor stator 24 corresponds to a stator of the electric motor. A brushless ac motor is constituted by the motor rotor 22 and the motor stator 24.

It is preferable that the ac motor can correspond to a high-speed rotation (for example, at least 100 to 200 thousand rpm) of the turbine shaft 12, and can execute a rotational drive at a time of accelerating and a regenerative operation at a time of decelerating. Further, it is preferable that a drive voltage of the ac motor is equal to or higher than (for example, 24 to 36 V) a dc voltage (for example, 12 V) of a battery mounted on the vehicle. It is possible to make the ac motor compact by increasing the drive voltage.

The inverter 26 has a function of converting a dc power of the battery mounted on the vehicle into an ac power having an optional frequency. It is preferable that the inverter 26 is constituted by an inverter of a pulse width modulation (PWM) controlling both of the frequency and the voltage. However, the present invention is not limited to this, but can employ an optional inverter, for example, a current type inverter easily executing the regenerative operation, in correspondence to the used electric motor.

An input terminal of the inverter 26 is connected to a dc voltage (for example, 12 V) of the battery mounted on the vehicle via a power cable (not shown). The input voltage of the inverter may be equal or lower or higher than the dc voltage (for example, 12 V) of the battery. In this case, it is preferable that the voltage is equal with the voltage of the control system of the entire vehicle.

An output terminal of the inverter 26 is connected to the motor stator 24 via a power supply cable 27. The power supply cable 27 is formed as short as possible, an electric resistance and an inductance of the power supply cable 27 is set small, and the power supply cable 27 limits the power loss to the minimum.

The inverter controller 28 controls a frequency and a voltage of the ac power generated by the inverter 26. The inverter controller 28 is connected to a control device of the entire vehicle or an engine controller by a control line (not shown), and is structured such as to control the frequency and the voltage.

The motor-driven supercharger 10 in accordance with the present invention is further provided with a driver container 29 accommodating the inverter 26 and the inverter controller 28, and an insulating coupling member 30 coupling the driver container 29 to the compressor housing 20.

The driver container 29 is entirely formed in a donut shape or a U shape in such a manner that the driver container 29 can be attached around a cylindrical ambient air suction portion 20c of the compressor housing 20 without protruding to the external portion.

Further, the insulating coupling member 30 has an air-cooled or water-cooled insulating layer insulating heat in such a manner as to prevent a high temperature of the air discharged from the compressor from being transferred to the driver container 29. The insulating coupling member 30 further has a vibration absorption function so as to absorb a vibration of the compressor housing 20 from being transmitted to the driver container 29.

In accordance with the structure mentioned above, since the driver container 29 is coupled to the compressor housing 20 to which the ambient air having a comparatively low temperature is introduced, and the driver container 29 is heat insulated by the insulating coupling member 30 having the air-cooled or water-cooled insulating layer, it is possible to prevent an overheat of the driver container 29, and the inverter 26 and the inverter controller 28 in the inner portion of the driver container.

Further, sine the driver container 29 is installed in the intake side of the compressor housing, it is possible to directly introduce a part of the ambient air having the comparatively low temperature and sucked by the compressor into the inner portion of the driver, and there can be obtained an excellent effect that it is possible to positively cool.

In this case, it goes without saying that the present invention is not limited to the embodiment mentioned above, but can be variously modified within the range of the scope of the present invention.

What is claimed is:

1. A motor-driven supercharger comprising:
   a turbine shaft having a turbine impeller in one end;
   a compressor impeller coupled to the other end of the turbine shaft;
   a bearing housing rotatably supporting the turbine shaft;
   a turbine housing surrounding the turbine impeller and coupled to the bearing housing;
   a compressor housing surrounding the compressor impeller and coupled to the bearing housing;
   a motor rotor fixed to the turbine shaft and rotating together with the turbine shaft;
   a motor stator surrounding the motor rotor and fixed within the bearing housing;
   an inverter converting a dc power into an ac power so as to input to the motor stator;
   an inverter controller controlling a frequency and a voltage of the ac power by the inverter on the basis of an external command;
   a driver container accommodating the inverter and the inverter controller; and
   an insulating coupling member coupling the driver container to the compressor housing,
   wherein the driver container is formed in a donut shape or a U shape, and
   wherein the insulating coupling member has an air-cooled or water-cooled insulating layer insulating heat in such a manner as to prevent a high temperature of the air discharged from the compressor from being transferred to the driver container.

2. The motor-driven supercharger as claimed in claim 1, wherein the inverter is constituted by an inverter of a pulse width modulation type controlling both a frequency and a voltage.

* * * * *